(12) United States Patent
Terashima

(10) Patent No.: US 7,797,519 B2
(45) Date of Patent: Sep. 14, 2010

(54) PROCESSOR APPARATUS WITH INSTRUCTION SET FOR STORING COMPARISON CONDITIONS AND FOR EVALUATING BRANCH CONDITION VALUES AGAINST RESULTS OF IDENTIFIED COMPLEX COMPARISON CONDITIONS

(75) Inventor: Masaru Terashima, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 12/133,032

(22) Filed: Jun. 4, 2008

(65) Prior Publication Data

US 2008/0313443 A1 Dec. 18, 2008

(30) Foreign Application Priority Data

Jun. 7, 2007  (JP) .............................. 2007-151927

(51) Int. Cl.
*G06F 9/30* (2006.01)
(52) U.S. Cl. ....................... 712/234; 712/236
(58) Field of Classification Search ....................... None
See application file for complete search history.

(56) References Cited

U.S. PATENT DOCUMENTS

| | | | | |
|---|---|---|---|---|
| 5,517,628 A | * | 5/1996 | Morrison et al. | 712/234 |
| 5,659,722 A | * | 8/1997 | Blaner et al. | 712/234 |
| 5,771,377 A | * | 6/1998 | Ando | 712/239 |
| 6,598,153 B1 | * | 7/2003 | Flachs et al. | 712/234 |
| 2007/0234019 A1 | * | 10/2007 | Terashima | 712/234 |
| 2009/0177874 A1 | * | 7/2009 | Terashima | 712/234 |

FOREIGN PATENT DOCUMENTS

| | | |
|---|---|---|
| JP | 5-274143 A | 10/1993 |
| JP | 6-290044 A | 10/1994 |
| KR | 10-2005-0078703 A | 8/2005 |

\* cited by examiner

*Primary Examiner*—Kenneth S Kim
(74) *Attorney, Agent, or Firm*—Sughrue Mion, PLLC

(57) ABSTRACT

There is disclosed a processing apparatus including, as an instruction set, a complex conditional branch instruction, and a condition setting instruction. The complex conditional branch instruction is an instruction for performing comparison operation for one or each of a plural number of conditions, and for performing branching to a branch target specified, based on comparison operation between the results of the comparison operations performed and the branching condition value specified. The condition setting instruction is an instruction for setting the condition. The processing apparatus includes a complex condition setting storage unit for storing the complex condition specified by the condition setting instruction, a condition comparison unit including a plurality of comparators for comparing the complex condition specified by the complex conditional branch instruction, in the complex condition setting storage unit, at the time of execution of the complex conditional branch instruction, a complex condition branching decision unit for determining on whether or not branching to the branch target is to be performed, using the results of comparisons performed in the comparators of the condition comparison unit and the branching condition value specified by the complex conditional branch instruction.

8 Claims, 11 Drawing Sheets

FIG. 5A

```
SETCMP s0, c0, r1, L, r11    // c0:r1<r11
SETCMP s0, c1, r2, GE, 10    // c1:r2≧10
SETCMP s0, c2, r3, EQ, r13   // c2:r3=r13
```

FIG. 5B

```
L1:
    PROCESSING A
    (EXECUTING OPERATIONS AND UPDATING THE VALUES OF r1~r3, r11 AND r13
     BY CALCULATIONS)

XBNE s0, 0111b, L1  // JUMP TO L1 IF THE CONDITIONS c0~c2 ARE ALL NOT MET (TRUE)
```

PROCESSING A

}while((r1<r11) && (r2≧10) && (r3==r13));
```

FIG. 6A

```
SETCMP  s0, c0, r1,  L, r11   // s0c0:r1<r11
SETCMP  s0, c1, r2, GE, 10    // s0c1:r2≧10
SETCMP  s0, c2, r3, EQ, r13   // s0c2:r3==r13
```

FIG. 6B

```
SETCMP  s1, c0, r2, EQ, 0     // s1c0:r2==0
SETCMP  s1, c1, r4,  G, r12   // s1c1:r4>r12
SETCMP  s1, c2, r4, NE, r14   // s1c2:r4!=r14
```

FIG. 6C

```
SETCMP  s2, c0, r5, EQ, 5     // s2c0:r2==5
SETCMP  s2, c1, r7, GE, 3     // s2c1:r5≧3
SETCMP  s2, c2, r8, EQ, r14   // s2c2:r5<12
```

FIG. 6D

```
SETCMP  s3, c0, r6, GE, 1     // s3c0:r6≧1
SETCMP  s3, c1, r6,  L, 10    // s3c1:r6<10
SETCMP  s3, c2, r6, NE, 4     // s3c2:r6!=4
```

FIG. 7E

```
    LD r10, 0        // LOAD 0 IN TO r10

L_LOOP:

PROCESSING A (PROCESSING OF EXECUTING OPERATIONS TO UPDATE VALUES OF r1~r3, r11 AND r13)
    XBNE s0, 0111b, L1   // JUMP TO L1 EXCEPT IF c0~c2 ARE ALL TRUE
    PROCESSING B
    JMP L_END

L1:

XBNE s1, 0111b, L2
    PROCESSING C
    JMP L4

L2:

XBL s2, 0001b, L3   // JUMP TO L3 IF r2==5 IS NOT TRUE
    PROCESSING D
    XBGE s2, 0110b, L4  // JUMP TO L4 IF (r5>=3)&&(r5<12) IS NOT TRUE
    PROCESSING E
    JMP L4

L3:

XBNE s3, 0111b, L4  // JUMP TO L4 IF (r6>=1)&&(r6<10)&& (r6!=4) IS NOT TRUE
    PROCESSING F

L4:
    PROCESSING G
L_END:

CMP r10, 0      // r10 IS UPDATED IN PROCESSING A~G
    JZ L_LOOP
```

FIG. 7F

```
r10 = 0
do{ // L_LOOP
    PROCESSING A
    If((r1<r11) & & (r2>=10) & & (r3==r13)){
        PROCESSING B
    }else{
        // L1
        if(r2==0) {
            if((r4>r12) & & (r4!=r14)){
                PROCESSING C
            }
        }else if(r2==5) { // L2
            PROCESSING D
            if((r5>=3) & & (r5<12)){
                PROCESSING E
            }
        }else{ // L3
            if((r6>=1) & & (r6<10) & & (r6!=4)){
                PROCESSING F
            }
        }
        // L4
        PROCESSING G
    }
    // L_END
}while(r10==0);
```

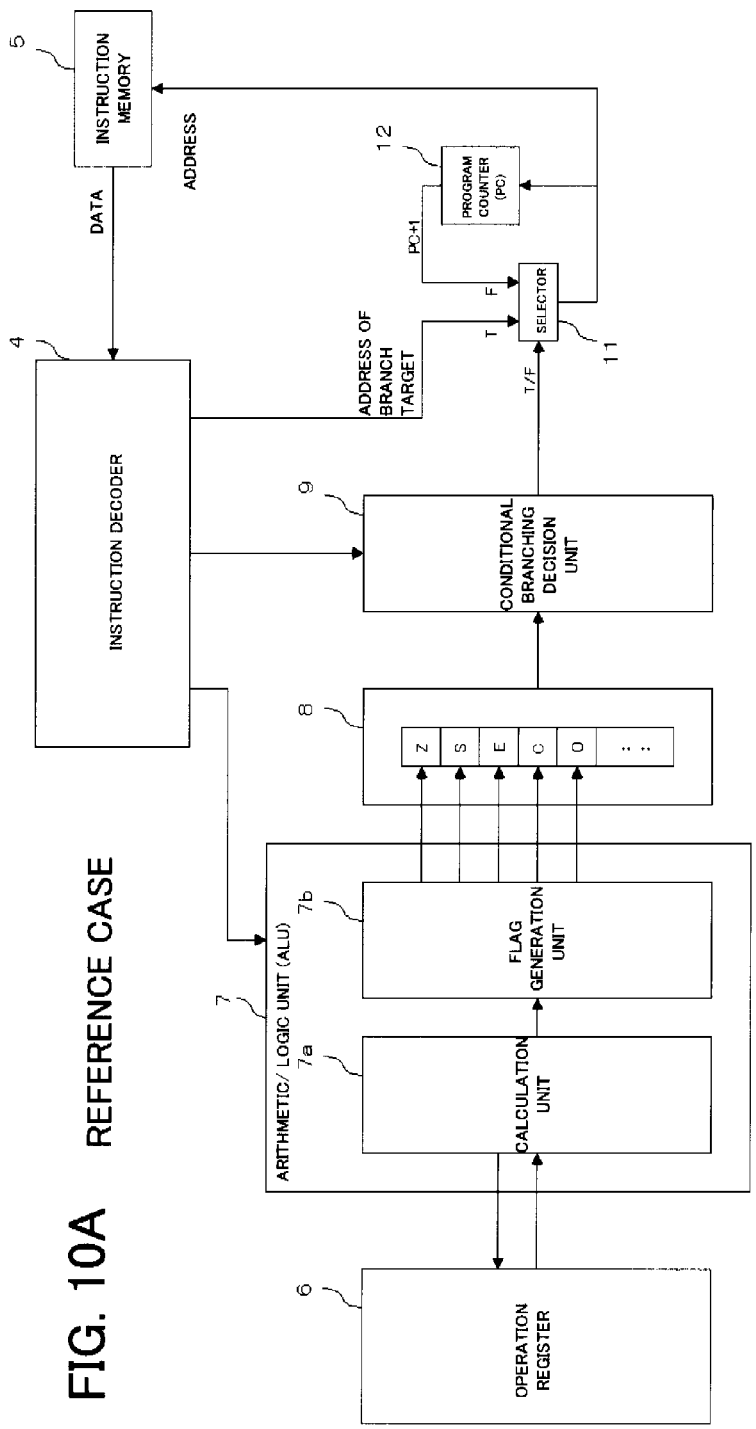
FIG. 10A  REFERENCE CASE
FIG. 10B  REFERENCE CASE

… # PROCESSOR APPARATUS WITH INSTRUCTION SET FOR STORING COMPARISON CONDITIONS AND FOR EVALUATING BRANCH CONDITION VALUES AGAINST RESULTS OF IDENTIFIED COMPLEX COMPARISON CONDITIONS

REFERENCE TO RELATED APPLICATION

This application is based upon and claims the benefit of the priority of Japanese patent application No. 2007-151927, filed on Jun. 7, 2007, the disclosure of which is incorporated herein in its entirety by reference thereto.

FIELD OF THE INVENTION

This invention relates to a processor for fetching, decoding and executing an instruction and, more particularly, to an apparatus for processing complex conditional branching.

BACKGROUND

For this type of complex condition processing system, Patent Document 1, discloses a configuration for parallel processing of a plurality of instructions. The configuration includes a flag register means, a logical product means, and an instruction fetch address selection means. The flag register means is able to set/reset bits independently in parallel in accordance with a true/false value of the result of execution of a plurality of instructions for comparison. The logical product means takes a bit-by-bit logical product of contents stored in the flag register means and a mask value specified by a conditional branch instruction. The instruction fetch address selection means selects, as an address of an instruction to be executed next, either an address of a branch target specified by the conditional branch instruction or an address of an instruction next following the conditional branch instruction, depending on whether or not the output value of the logical product means is zero. It is determined whether or not branching is to be executed with bit states of respective bit positions of the flag register means specified by the mask value as the complex condition.

In a parallel processing apparatus, described in Patent Document 1, there are provided a plurality of decoders for decoding compare instructions. These decoders execute a plurality of compare instructions simultaneously. The results are stored in a flag register, and conditional branching is performed in dependence upon the states of the flag register.

The complex conditional processing system, disclosed in Patent Document 1, is outlined. An assembler instruction (compiled result) corresponding to a program by the C language:

if (X>1 && X<10 && X!=5)
{processing when the complex condition is met} where && denotes an AND operation, is taken as an example for explanation. It should be noticed that, with the above program of the C language, branching takes place in such a manner that, if all of the conditions X>1, X<10 and X!=5, are met, the next instruction, that is, the {processing when the complex condition is met}, is executed. If at least one or more of the three conditions is not met, the {processing when the complex condition is met} is not executed. According to Patent Document 1, the compiled result of the above program of the C language may be represented by

SLE X, 1, 0 SGE X, 10, 1 SEQ X, 5, 2
BNZ 7, $1

(processing when complex condition is met)
$1 (processing at the branch target)

In the first compare instruction SLE X, 1, 0, . . . , comparison operation of the complex condition is performed. The SLE compare instruction is a compare instruction of the format "SLE A, B, C" in which A and B are compared to each other and in which a bit C (any of bit 0 to bit 3) of the flag register is set to "1" if A<=B, while being set to "0" if otherwise. The SGE compare instruction is a compare instruction of the format "SGE A, B, C" in which A and B are compared to each other and in which a bit C (any of bit 0 to bit 3) of the flag register is set to "1" if A>=B, while being set to "0" if otherwise. A SQE compare instruction is a compare instruction of the format "SQE A, B, C" in which A and B are compared to each other and in which a bit C (any of bit 0 to bit 3) of the flag register is set to "1" if A=B, while being set to "0" if otherwise.

In the second conditional branch instruction BNZ 7, $1, bit operations on the results of the comparison operation of the complex condition and the branching condition value (mask value) "7" are performed bit by bit. If the conditions fail to hold, a jump to the address $1 occurs. The BNZ conditional branch instruction is of the format "BNZ M, L". A logical product is taken between M (mask value) and the corresponding bits of the flag register. A zero decision circuit decides whether or not the results of logical product are all "0". If the results are all zero, the zero decision circuit outputs "1", while outputting "0" if otherwise. An output signal of the zero decision circuit (zero/non-zero decision result) is output as a signal indicating branch-taken/branch-not-taken. If branch is taken, the branch to an address specified by L occurs. In BNZ 7, $1, the mask value is "0111" and conditional branching takes place in accordance with the values of bits 0 to 2 of bits 0 to 3 of the flag register.

In this manner, two instructions, that is, compare instruction SLE X, 1, 0, . . . and conditional branch instruction BNZ, are used.

In this exemplary program, if at least one or more of the three compare conditions for a value X (corresponding to a register), that is, (X>1, X<10 and X!=5) fails to hold, that is, if at least one of three conditions: X<=1, X>=10 and X=5, in terms of an assembler code, holds, the branching to the branch target $1 occurs. The results of the comparison may be inverted to set all logical conditions to the OR condition.

In Patent Document 2, there is disclosed a configuration in which a condition value selector selects a value for selecting an external state signal and a value for code control, using an instruction output by a pipelining register. The so selected value is used to select a signal from the external state signal by a condition code selector, and a code controller decides the polarity and a next address selector is able to select and output a non-branch address or a branch address. Thus, in case of changing the condition for branching or the polarity decision condition of a program sequence, the condition for branching or the polarity decision condition can be changed simply by changing the contents of the condition register, without changing the instruction word stored in the instruction memory.

[Patent Document 1] JP Patent Kokai Publication No. JP-A-5-274143

[Patent Document 2] JP Patent Kokai Publication No. JP-A-6-290044

The entire disclosures of Patent Documents 1 and 2 are incorporated herein by reference thereto. The following analyses are given by the present inventor.

With the complex conditional processing scheme, described in Patent Document 1, no particular problem is raised in case the complex condition is executed only once. However, if the scheme is used for loop processing of repeatedly executing the same complex condition, there are problems described in the below. It is noted that the following is the results of analyses by the present inventor.

The first problem is that, since the two instructions, that is, the compare instruction of the complex condition and the conditional branch instruction, need to be executed as a set, a number of execution cycles corresponding to two steps is required for each conditional branch processing. This point will be discussed in detail hereinbelow.

With the complex conditional processing scheme disclosed in Patent Document 1, a number of cycles corresponding to two instructions are needed, as shown in FIGS. 11A and 11B. It should be noticed that FIGS. 11A and 11B are formulated by the present inventor to illustrate the operation of the complex conditional processing system disclosed in Patent Document 1.

In the example shown in FIGS. 11A and 11B, six cycles, corresponding to two instructions, namely the compare instruction (SLE X, 1, 0, . . . ) and the conditional branch instruction (BNZ), are needed for each conditional branch processing. These six cycles are F (instruction fetch), D (instruction decode), Ex (execute), F, D, Ex). See 8-1, 8-2 and 8-3 of FIG. 11. The compare instruction for the complex condition (SLE X, 1, 0, . . . ) executes respective comparison operations corresponding to a plurality of conditions making up the complex condition in parallel and set the results of the comparison operations in specified bits of the flag register. The conditional branch instruction (BNZ) decides on branching/non-branching based on the results of logical operations of the flag register value and the mask value. Thus, with the complex conditional processing scheme, disclosed in Patent Document 1, the instruction is divided into two, namely the compare instruction and the conditional branch instruction, so that at least two cycles, that is, a cycle for instruction fetch and a cycle for instruction decoding, need to be executed at least twice, resulting in an increased number of cycles. The number of cycles in the loop processing is increased appreciably, thus limiting the processing performance.

The second problem is that, in the complex conditional processing scheme, disclosed in Patent Document 1, the compare instruction is configured so that the plural condition making up the complex condition are evaluated with one instruction in parallel, as a result of which, a long instruction word is needed to represent a plurality of conditions.

For example, regarding the compare instruction:

SLE X, 1, 0 SGE X, 10, 1 SEQ X, 5, 2

8 bits are needed for an instruction code (operation code) for a processor assumed to have up to 256 instructions, 3 bits are needed for comparator selection, because there are six comparators and one out of six comparators is to be selected, 4 bits are needed for register selection, if one out of 16 registers is to be selected, as for an operand X, 4 bits are needed if one out of 0 to 15 may be specified as condition value of an operand (it should be noted that 1 of "SLE X, 1, 0" corresponds to 1 on the right side of the condition for comparison X<=1), and In addition, 2 bits are needed for specifying the bit position in the flag register of an operand (any one of bits of 0 to 3).

Then, 8+4+(3+4+2)×3=39 bits are needed for the instruction (see Table 1 below).

TABLE 1

| Instruction code | Register | comparator 0 | condition value 0 | flag bit 1 | comparator 1 | comparator 1 | flag bit 2 | comparator 2 | condition value 2 | flag bit 3 |
|---|---|---|---|---|---|---|---|---|---|---|
| 8 bit | 4 bit | 3 bit | 4 bit | 2 bit | 3 bit | 4 bit | 2 bit | 3 bit | 4 bit | 2 bit |
| | X | LE | 1 | 0 | GE | 10 | 1 | EQ | 5 | 2 |
| XXXX XXXX | XXXX | 011 | 0001 | 00 | 101 | 1010 | 01 | 000 | 0101 | 10 |

The instruction word (byte) length is increased because the parallel processing apparatus of Patent Document 1 specifies all conditions constituting the complex condition with one instruction (compare instruction).

SUMMARY OF THE DISCLOSURE

The invention disclosed in the present application are configured as follows:

In one aspect of the present invention, there is provided a processor apparatus comprising an instruction set including a conditional branch instruction in which branching to a branch target is performed or not depending on whether or not a condition holds; and a condition setting instruction that sets the condition. In the processor apparatus, there are also provided a condition setting storage unit that, when said condition setting instruction is executed, stores the condition specified by said condition setting instruction; a condition comparison unit that, when said conditional branch instruction is executed, performs comparison operation on the condition selected by said conditional branch instruction, out of one or more conditions stored in said condition setting storage unit; and a branch condition decision unit that determines whether or not branching occurs to the branch target, based on the result of the comparison operation in said condition comparison unit.

According to the present invention, the conditional branch instruction is a complex conditional branch instruction including a complex condition made up of plurality of conditions for decision on branching. The condition setting storage unit includes at least one complex condition storage unit for storing a plurality of conditions making up the complex condition of the complex conditional branch instruction, and a circuit that enables the complex condition storage unit specified by the complex conditional branch instruction. The condition comparison unit executes comparison operation for each of the conditions stored by the complex condition storage unit specified by the complex conditional branch instruction at the time of executing the complex conditional branch instruction.

According to the present invention, the condition comparison unit includes a plurality of comparators for comparing, in parallel, the plural conditions stored in the complex condition storage unit specified by the complex conditional branch instruction. The branch condition decision unit determines whether or not branching to a branch target is to be performed based on the results of comparison by the comparators.

According to the present invention, the condition setting instruction specifies, by an operand, which one of the complex condition storage units of the condition setting storage is used and what number condition is to be set in the complex condition storage unit.

According to the present invention, the processor apparatus includes, as an instruction set, a complex conditional branch instruction and a condition setting instruction. The complex conditional branch instruction is used for performing comparison operations on a plurality of conditions that make up a complex condition specified and for performing branching to a branch target based on comparison operation between the results of comparison operations and a branching condition value specified. The condition setting instruction is used for specifying a complex condition and one of the conditions that make up the complex condition and for setting the specified one condition in the. The apparatus comprises a complex condition setting storage unit for storing a plurality of the complex conditions as set on execution of the condition setting instruction. The complex condition is made up of a plurality of conditions. The apparatus also comprises a condition comparison unit for performing comparison operation, at the time of executing the complex conditional branch instruction, on each of the plural conditions that make up the complex condition specified by the complex conditional branch instruction, out of the complex conditions stored by the complex condition setting storage unit. The apparatus also comprises a complex condition branching decision unit for giving a decision on whether or not branching to the branch target is to be performed, using the result of comparison of the results of comparison operations performed by the condition comparison unit and a the branching condition value specified by the complex conditional branch instruction.

In a method for processing conditional branching in a processor, according to the present invention, an instruction set includes a conditional branch instruction of performing branching or non-branching to a branch target, depending on whether or not a condition holds, and a condition setting instruction of storing the condition. The method includes:

executing the condition setting instruction a plural number of times for setting a plurality of conditions to store the conditions in a storage, and performing comparison operation, when the conditional branch instruction is executed, on the condition selected by the conditional branch instruction, out of the conditions pre-stored by the condition setting instruction; and giving a decision as to whether or not branching to the branch target is to be performed, based on the results of the comparison operation.

In the method for processing conditional branching, according to the present invention, the conditional branch instruction is a complex conditional branch instruction in which the condition is a complex condition made up of a plurality of conditions for a branching decision/non-branching. The method includes executing a plurality of the condition setting instructions to store one or a plurality of condition set(s). Each condition set is made up of a plurality of conditions making up a complex condition of the complex conditional branch instruction. The method also includes selecting, at the time of executing the complex conditional branch instruction, the complex condition specified by the complex conditional branch instruction, out of the complex condition pre-set by the condition setting instruction. The method further includes executing comparison operation for the complex condition selected, and giving a decision on branching/non-branching based on the comparison operation of the complex condition. The processing for conditional branching for the complex condition is able to be executed by one complex conditional branch instruction.

The meritorious effects of the present invention are summarized as follows.

According to the present invention, a condition setting instruction is executed to store conditions for branching, and the conditional branch instruction selects the pre-set conditions, in such a manner as to suppress the increase in the number of cycles and the length of the instruction. According to the present invention, the larger the number of times of repetition of decision of the same condition, the greater is the effect in improving the processing efficiency.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 5A, 5B and 5C show an example of a program employing a condition setting instruction and a complex conditional branch instruction according to an example of the present invention.

FIGS. 6A to 6D show another example of a program employing a condition setting instruction and a complex conditional branch instruction according to an example of the present invention.

FIGS. 7E and 7F, continuing from FIG. 6D, show the other example of the program employing a condition setting instruction and a complex conditional branch instruction according to an example of the present invention.

FIGS. 10A and 10B show a block diagram for illustrating the configuration of a comparative example and a conditional branch instruction.

PREFERRED MODES OF THE INVENTION

Figure 1:
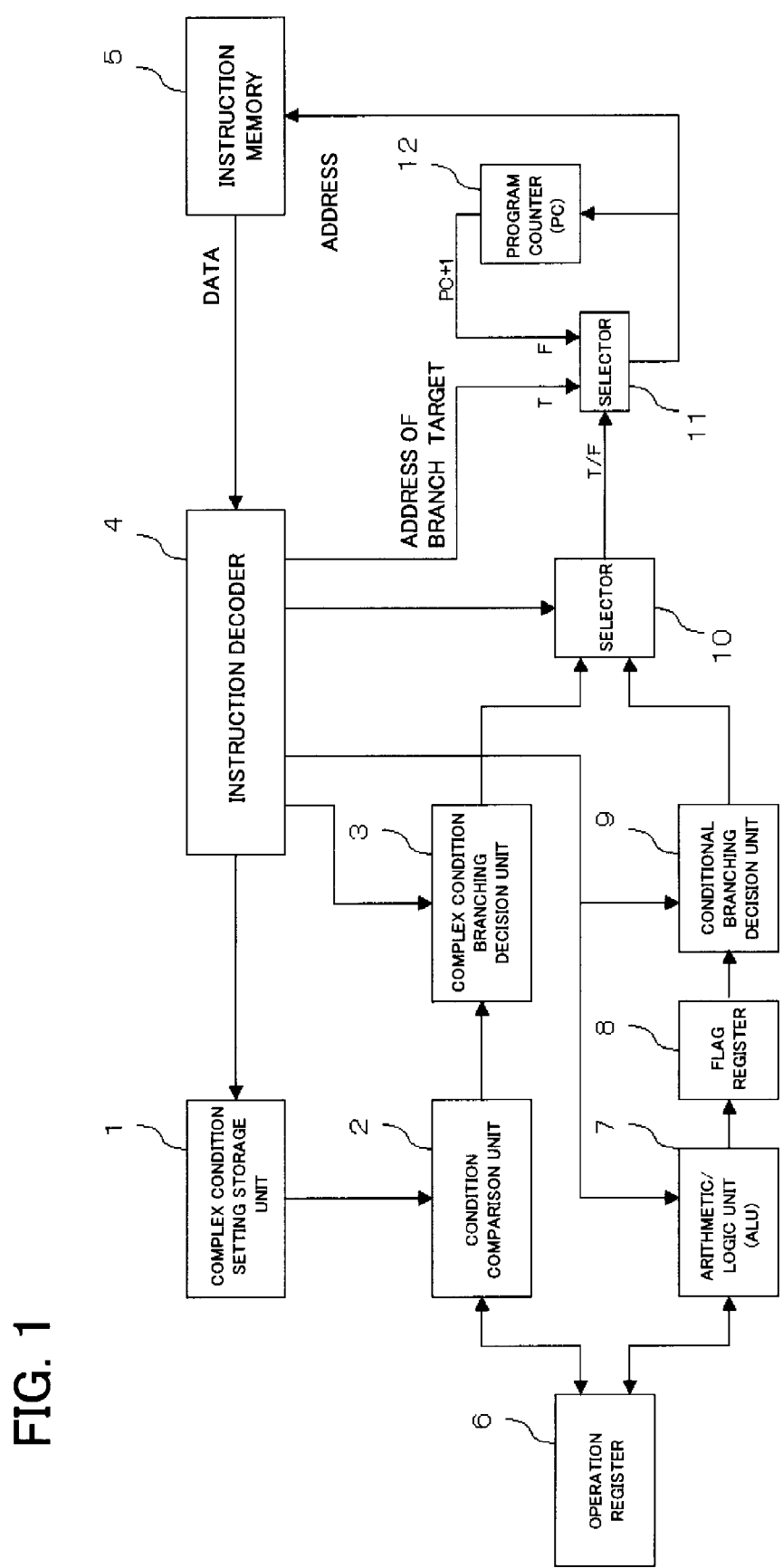
FIG. 1 is a block diagram showing the configuration of an example of the present invention.

According to the present invention, a plurality of complex conditions are stored in a complex condition setting storage unit by executing a plurality of condition setting instructions.

It is however possible to store only one complex condition in the complex condition setting storage unit. Any one of the complex condition pre-stored in the complex condition setting storage unit is selected at the time of executing the complex conditional branch instruction to execute the processing of conditional branching. The configuration according to the present invention may well be applied to more complicated conditions and multi-loop (nested loop) processing to speed up the operation of conditional branching.

A processor apparatus according to one mode of the present invention includes, in an instruction set thereof, (A) a complex conditional branch instruction, and (B) a condition setting instruction.

The complex conditional branch instruction performs comparison operations on a plurality of conditions that make up a complex condition specified in the complex conditional branch instruction. The complex conditional branch instruction also performs the branching to a specified branch target, based on a result of comparison of the comparison operation with a value of the branching condition specified in the complex conditional branch instruction.

The condition setting instruction specifies the particular one of the conditions that make up a complex condition and sets the so specified condition.

The processor according to the present invention includes, as units for executing an instruction decoded by an instruction decoder, a complex condition setting storage unit (1), a condition comparison unit (2) and a complex condition branching decision unit (3). The complex condition setting storage unit (1) is configured to store one or more set of complex conditions, specified by the condition setting instruction. The condition comparison unit (2) executes comparison operation on each of plural conditions that make up a complex condition specified by the complex conditional branch instruction, out of the complex condition stored and stored by the complex condition setting storage unit (1). The complex condition branching decision unit (3) determines whether or not branching to a branch target is to be performed, with the use of comparison of the results of comparison operations performed by the condition comparison unit (2) with the value of the conditional branching specified by the complex conditional branch instruction.

According to the present invention, the condition setting instruction includes, in an operand thereof:

information specifying the destination of storage of the complex condition in the complex condition setting storage unit (1);

information indicating what number condition out of plural conditions that make up the complex condition is specified;

a type of the comparison operation; and register addresses of operation registers subjected to the comparison operation, or a register address of the operation register and immediate data subjected to the comparison operation.

According to the present invention, the complex conditional branch instruction may include, in an operation code thereof, a type of the comparison operation, such as a type of the comparison operation for a plurality of comparison results regarding a plurality of conditions constituting the complex condition, such as NE, EQ and the like. The complex conditional branch instruction may include, in an operand thereof: information specifying a storage area of the complex condition in the complex condition setting storage unit in which the complex condition is stored, a branching condition value, and a branch target.

According to the present invention, the complex condition setting storage unit (1) may include a plurality of complex condition storage units (100, 200, 300 and 400 in FIG. 2), each including a plural number of condition storage units (101, 102, and 103) corresponding to the number of the conditions that make up a complex condition specified in the complex conditional branch instruction. In each of the condition storage units (101, 102, and 103 of FIG. 2) are stored, as a set, first and second addresses of two registers for operation, as the subjects of comparison, immediate value, a flag, and the type of the operations of the comparators.

The flag stores the species indicating whether the comparison operation is performed between data of the registers for operation, or between the data of the operation register and immediate data.

Each of the complex condition storage units (100, 200, 300 and 400 in FIG. 2) includes a selector (104) for selecting the condition storage unit specified by the condition setting instruction.

The complex condition setting storage unit (1) may include a selector (500 in FIG. 2) for selecting one of the complex condition storage units (100, 200, 300 and 400 in FIG. 2) which is matched to the complex condition specified by the complex conditional branch instruction. The selector (500) also selects the complex condition storage unit specified by the condition setting instruction. There are cases wherein not all of the four complex condition storage units (100, 200, 300 and 400 of FIG. 2) in the complex condition setting storage unit (1) are used, such that, depending on the program configuration, only one or two of the complex condition storage units are used. When the four complex condition storage units are provided, four different complex conditions may be stored and stored prior to execution of the complex conditional branch instruction. Basically, the contents stored in the condition storage units (101, 102, 103) are stored until the contents are rewritten by the execution of a next condition setting instruction.

The condition comparison unit (2) includes a plurality of sets (201, 202 and 203 of FIG. 3) in association with the plural condition storage units (101, 102 and 103) in the complex condition storage unit. The sets each include first and second decoders (201a, 201b in FIG. 3), a selector (201c in FIG. 3), and a comparator (201d in FIG. 3).

The first and second decoders (201a, 201b in FIG. 3) decode the first and second addresses, stored in the condition storage unit (for example, 101 in FIG. 3), respectively, supply first and second register addresses to the set of operation register, respectively, and hold data read out from the set of operation registers.

The selector (201c in FIG. 3) receives the immediate data stored in the complex condition storage unit and a value of the second decoder to select one of the immediate data and the second decoder value, based on an output of the flag.

The comparator (201d in FIG. 3) receives an output of the selector (201c in FIG. 3) and an output of the first decoder (201a in FIG. 3) as inputs and performs operations matched to the type of the operations stored in the complex condition storage unit.

In the complex condition setting storage unit, the condition set as a result of execution of the condition setting instruction is rewritten to another condition on execution of another condition setting instruction after execution of the first-stated condition setting instruction, and on selection of the condition storage unit by the other condition setting instruction.

The processor apparatus further includes a fourth selector (10) having inputs connected to an output of a conditional branching decision unit (9) that performs condition decision based on a flag register (8 of FIG. 1) reflecting the results of operations in an arithmetic/logic unit (7 of FIG. 1), and to an output of the complex condition branching decision unit (3). The fourth selector (10) selects the output of the complex condition branching decision unit (3) in case the conditional branch instruction decoded by an instruction decoder (4) is the complex conditional branch instruction, while selecting the output of the conditional branching decision unit (9) in case the conditional branch instruction decoded by the instruction decoder (4) is a conditional branch instruction other than the complex conditional branch instruction. The processor apparatus further includes a selector (11 in FIG. 1) that receives a true/false value of the result output from the selector (10). The selector (11) selects the branch address specified by the conditional branch instruction decoded by the instruction decoder (4) if the output is true. The selector (11) selects, if the output of the selector (10) is false, an address corresponding to the current value of a program counter (12) incremented by one, and sets the incremented value in the program counter (12).

FIG. 1 is a block diagram showing the configuration of an example of the present invention. Referring to FIG. 1, a micro-computer of the present example includes a complex condition setting storage unit 1, a condition comparison unit 2, a complex condition branching decision unit 3, an instruction decoder 4, an instruction memory 5, a set of general-purpose operation registers 6, an arithmetic/logic unit (ALU) 7, a flag register 8, a conditional branching decision unit 9, a selector 10, a selector 11, and a program counter (PC) 12. The complex condition setting storage unit 1 is adapted to store a plurality of complex conditions. The condition comparison unit 2 performs comparison operations for respective conditions of the complex condition. The complex condition branching decision unit 3 determines whether or not program branching is to be performed regarding a complex conditional branch instruction. The instruction decoder 4 holds and analyzes an instruction code and controls a block relevant to the instruction. The instruction memory 5 stores instruction codes. The operation registers 6 are used by a processor in executing operations. The ALU 7 performs a arithmetic and logic operation relevant to an operation instruction. The flag register 8 holds a variety of flags generated based on the results of operations performed by the ALU 7. The conditional branching decision unit 9 determines whether or not program branching should occur with the conditional branch instruction. The selector 10 selects an input value depending on whether the instruction is the conditional branch instruction or the complex conditional branch instruction. The selector 11 selects an address of branch target or an address of the next instruction (the present program counter value PC+1). The program counter (PC) 12 designates a location of the instruction execution of the processor.

To help understand the present invention, the operation of ordinary conditional branching, which is not the complex conditional branching as described with reference to Patent Document 1, is now described using a comparative example (reference case) shown in FIGS. 10A and 10B. Referring to FIG. 10B, the conditional branching is performed in a sequence such that an instruction (i), such as an instruction for arithmetic/logic operation (ADD r1, 5) or a compare instruction (CMP r1, 100), is initially executed, after which a conditional branch instruction (BEQ L1) (ii) is executed. This operation is now described with reference to a block diagram of FIG. 10A.

Data, that is, an instruction code, is initially fetched to the instruction decoder 4 from an address of the instruction memory 5 indicated by the value of the program counter (PC) 12.

This instruction is a compare instruction (CMP r1, 100 (i) of FIG. 10B).

The instruction decoder 4 analyzes the instruction code and supplies an operation code (CMP) and operands (r1 and 100) to the arithmetic and logic unit (ALU) 7.

The value of a first register (r1) of the set of operation registers 6 is read by an operation unit 7a of the ALU 7 and compared to a value 100 (immediate data).

Based on the results of the operation, a flag generation unit 7b calculates a variety of flag values, which are then stored in the flag register 8. In FIG. 10A, these flags, namely Z, S, E, C and O, are as follows:

The flag Z is a zero flag. The flag Z is 1 if the result of the operation is zero and 0 if otherwise.

The flag S is a sign flag and is 1 or 0 when the result of the operation is of a negative value or a positive value, respectively.

The flag E is an even flag and is 1 or 0 when the result of the operation is even or odd, respectively.

The flag C is a carry flag and becomes 1 when the result of the operation indicates that a digit place is transferred to the next higher or lower place as a result of the operation.

The flag O is an overflow flag which becomes 1 in case of an overflow of the result of the operation.

The instruction decoder 4 determines that the compare instruction is not accompanied by branching, and controls the selector 11 to select F (false).

This causes the instruction of the next address to be fetched to the instruction decoder 4.

The next instruction is a conditional branch instruction (BEQ L1 (ii) of FIG. 10B).

The instruction decoder 4 analyzes the instruction code and supplies an operation code (BEQ) to the conditional branching decision unit 9 to output the operand (L1), that is, an address of the branch target, to the selector 11. This value is stored by a register in the instruction decoder 4.

The conditional branching decision unit 9 selects the zero flag based on the type of the operation code. Specifically, the conditional branching decision unit 9 outputs T (true) to the selector 11 if the value of the zero flag is 1 (EQ holds), while outputting F (false) to the selector 11 if the value of the zero flag is 0 (EQ fails to hold).

In case the result of decision of the conditional branching decision unit 9 is T (true), the selector 11 selects an address (L1) of the branch target, and the instruction located at the branch target address is executed. In case the result of decision is F (false), "PC+1" is selected, such that an instruction at the next address is executed.

Thus, in the ordinary conditional branching, an instruction for arithmetic/logic operation and/or a compare instruction is executed and the information for conditional branching is stored in the flag register 8, in advance. In the conditional branch instruction, executed next, the value stored in the flag register 8 is evaluated when executing the condition for branching, specified by the instruction code, to determine whether or not branching is to be performed. That is, two instructions, namely an instruction for the arithmetic/logic operation and/or a compare instruction, and a conditional branch instruction are executed as a set. In this case, when the ordinary conditional branching is executed, two instructions are executed at all times.

The operation for the complex conditional branch instruction according to the present invention is now described. In an example of the present invention, a condition setting instruction and a complex conditional branch instruction are added as an instruction set of a processor. The instruction decoder is configured to be able to analyze these newly added instructions. The complex condition setting storage unit 1, condition comparison unit 2, complex condition branching decision unit 3 and the selector 10 for selecting the results of decision of the complex condition branching decision unit 3 and the conditional branching decision unit 9 are provided as components for executing the added instructions, that is, the condition setting instruction and the complex conditional branch instruction.

Figure 2:
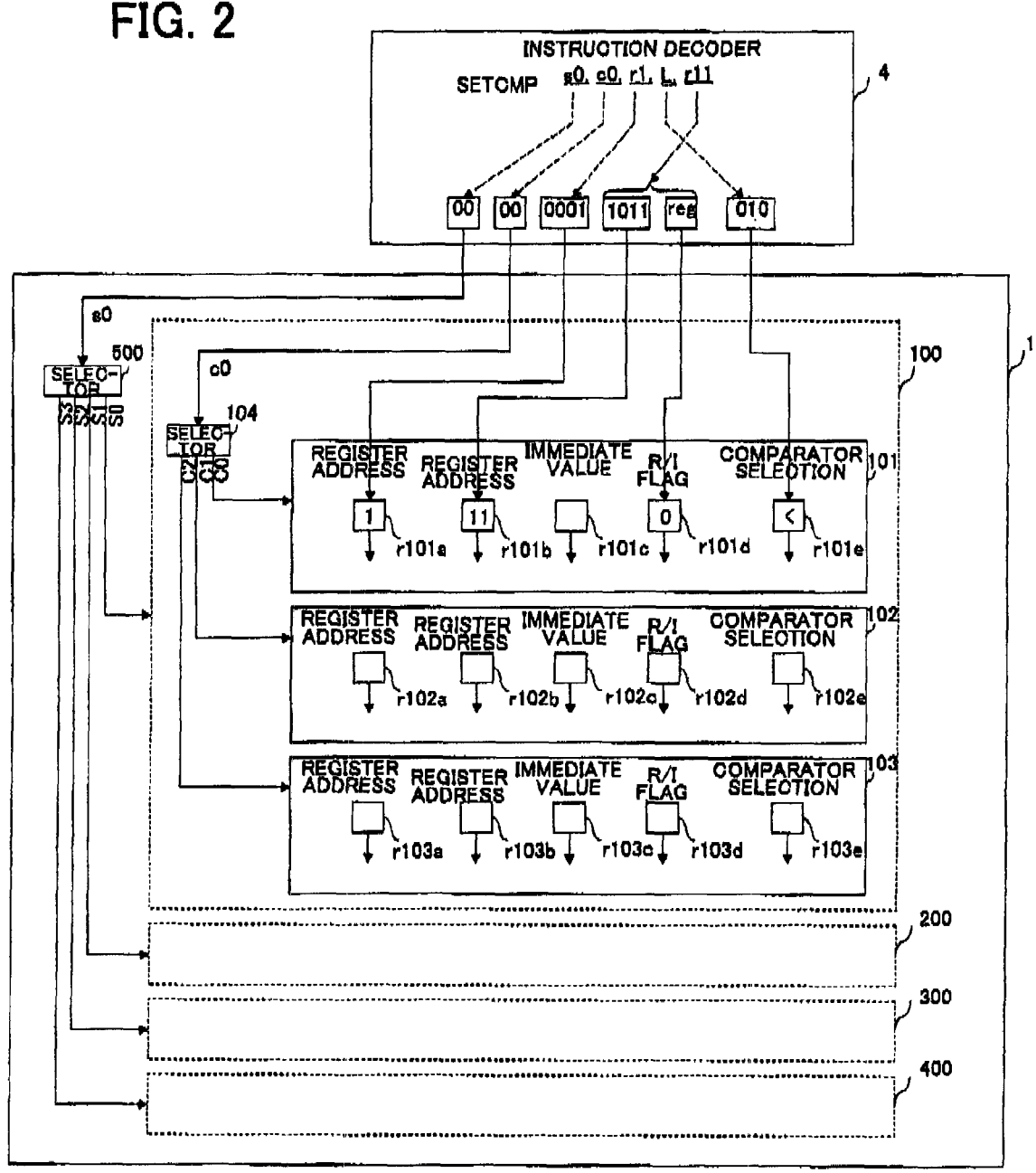
FIG. 2 is a schematic view showing the configuration of a complex condition storage unit according to an example of the present invention.

FIG. 2 shows the configuration of the complex condition setting storage unit 1 shown in FIG. 1. Referring to FIG. 2, the complex condition setting storage unit 1 includes complex condition storage units 100, 200, 300 and 400 for storing the complex condition used in giving a decision on branching/non-branching by the complex conditional branch instruction, and a selector 500 for selecting one of the complex condition storage units 100 to 400 as being valid.

The complex condition storage unit 100 includes a condition storage unit 101 for storing a first one of the conditions that make up a complex condition, a condition storage unit 102 for storing a second one of the conditions that make up the complex condition, a condition storage unit 103 for storing a third one of the conditions that make up the complex condition, and a selector 104 for selecting which one of the conditional storage units 101 to 103 is to be enabled (or activated). It should be noted that, although the internal configurations of the complex condition storage units 200, 300 or 400 are not shown, these are similar in configuration to the complex condition storage unit 100.

In the condition storage unit 101, r101a is a register for storing an address of a first register of the set of operation registers 6, r101b is a register for storing an address of the second register of the set of operation registers 6, r101c is a register for storing immediate data, r101d is a register for storing an R/I flag, and r101e is a register for storing the type of operations performed by a comparator as later described. It should be noticed that R and I in the R/I flag mean a register or a register address and 'immediate', respectively.

Figure 3:
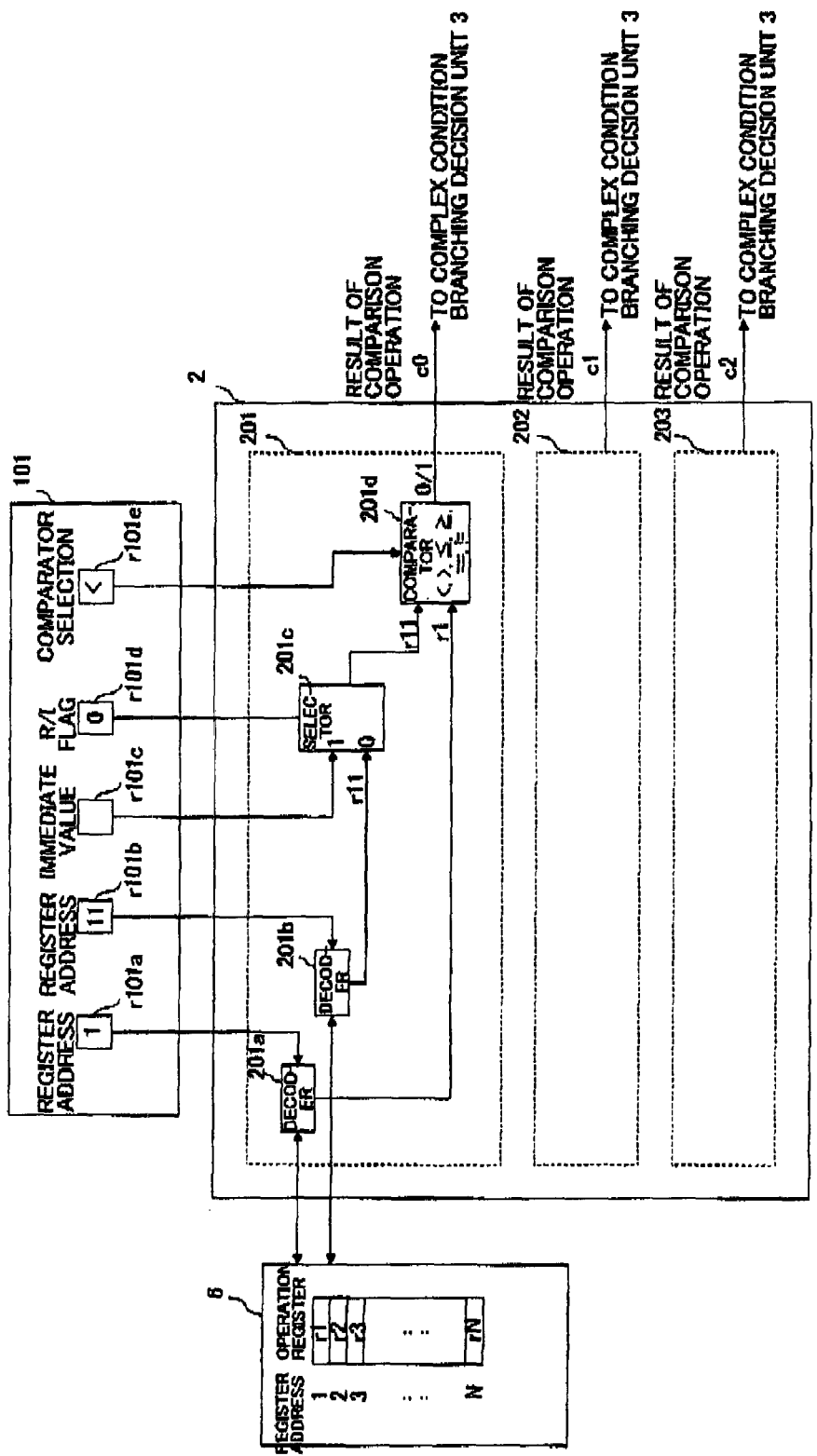
FIG. 3 is a schematic view showing the configuration of a condition comparison sub-units and related parts according to an example of the present invention.

FIG. 3 shows the configuration of the condition comparison unit 2 of FIG. 1. In the present example, the condition comparison unit 2 includes three condition comparison sub-units 201, 202 and 203, associated respectively with the condition storage units 101, 102 and 103.

The condition comparison sub-unit 201 includes decoders 201a and 201b for respectively receiving and decoding the addresses from the registers (address registers) r101a and r101b of the condition storage unit 101 of the complex condition storage unit 100 and for selecting the registers of the set of operation registers 6. The address registers are used to store the register addresses of the set of operation registers 6.

The condition comparison sub-unit 201 also includes a selector 201c for receiving, as a selection control signal, the value of an R/I flag r101d of the condition storage unit 101 of the complex condition storage unit 100, and also for receiving the immediate value from the register r101c of the condition storage unit 101 of the complex condition storage unit 100 and an output of the decoder 201b to select either one of them.

The condition comparison sub-unit 201 further includes a comparator 201d for performing comparison operation on the register value in the set of operation registers 6 (output r1 of the decoder 201a) and the value r11 output from the selector 201c. Although the internal configurations of the condition comparison sub-units 202, 203 are not shown for simplicity, these are similar in configuration to the comparison sub-unit 201.

According to the present invention, the condition setting instruction and the complex conditional branch instruction are newly provided in a set of processor instructions.

The condition setting instruction is an instruction for setting a condition for performing the comparison operation, and may be expressed in a mnemonic of an assembler by SETCMP s0,c0,r1,L,r11 (1)

"SETCMP" denotes the name of the condition setting instruction.

"s0" denotes setting of the first complex condition, that is, the complex condition storage unit 100 in the complex condition setting storage unit 1 (see FIG. 2). In similar manner, "s1", "s2" and "s3" denote the complex condition storage units 200, 300 and 400 in the complex condition setting storage unit 1, respectively (see FIG. 2).

"c0" denotes the first condition, that is, the condition storage unit 101 (see FIG. 2).

Similarly, "c1" and "c2" denote the condition storage units 102, 103, respectively (see FIG. 2).

"r1" and "r11" denote registers of the register addresses 1 and 11 in the set of operation registers 6, respectively.

"L" denotes the type of a comparison operation section used for comparing r1 and r11 "<" (Less).

FIG. 2 schematically shows the state in the instruction decoder 4 in which the instruction code in the condition setting instruction of (1) above has been analyzed and decoded into a bit string.

That is, s0 (00b), where b indicates the binary notation, is supplied to the selector 500, which selector then selects the complex condition storage unit 100.

"c0" (00b) is supplied to the selector 104, which selector 104 selects the condition storage unit 101.

"r1" (0001b) is supplied to and stored in the register r101a.

"r11" (1011b) is supplied to and stored in the register r101b.

The R/I flag (0b) is supplied to and stored in the register r101d.

The type of the comparator "L" (010b) is supplied to and stored in the register r101e.

In this case, 1, 11 and 0 in binary representation and a symbol corresponding to a binary operator "<" are respectively stored in the registers r101a, r101b, r101d and r101e of the condition storage unit 101 of FIG. 2. It is noted that the selector 104 has selected the condition storage unit 101. No value is set in the immediate value r101c.

These values are stored unchanged until the condition setting instruction for the condition storage unit of the same location are executed next.

The complex conditional branch instruction is an instruction for performing comparison operation of the conditions set by the condition setting instructions and for performing comparison operation of the results thereof with a value of the condition for branching. In the mnemonic of an assembler, the complex conditional branch instruction is expressed by XBNE s0,0111b,L1 (2)

"XBNE" is the name of the complex conditional branch instruction.

"NE" denotes the type of a comparison operation section "!=", and

X expresses that the instruction is an extension of the ordinary conditional branching BNE, that is, the instruction is that for complex conditional branching.

"s0" denotes setting of the first complex condition, that is, it denotes that the complex condition storage unit 100 is to be selected.

"0111b" denotes a value of the conditional branching 3a, that is, it denotes the value in binary representation to be compared to the results of comparison operations of the respective conditions.

"L1" denotes the address to which branching occurs in case the result of decision of the conditional branching is true, that is, the branch target address of a program.

Figure 4:
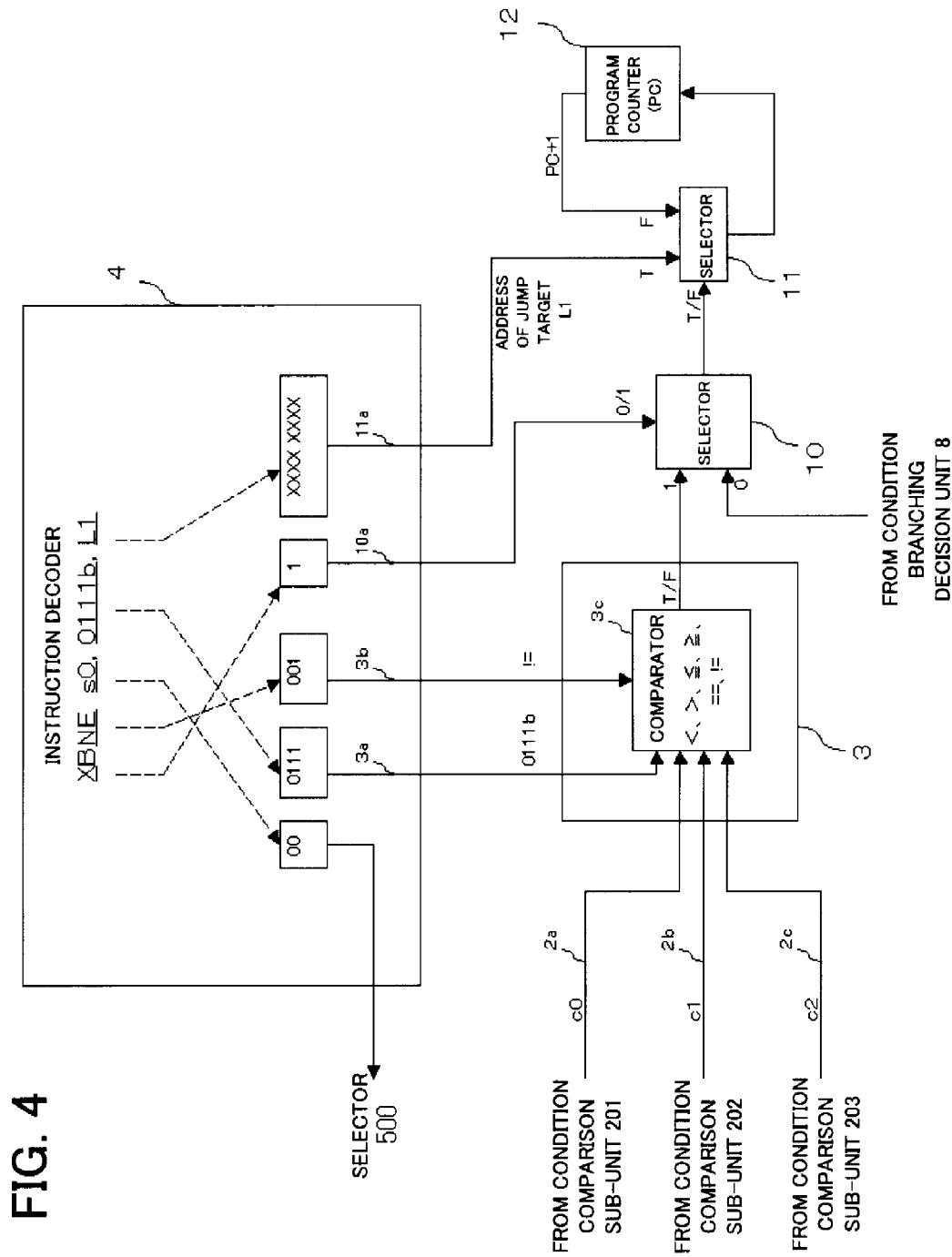
FIG. 4 is a schematic view showing the configuration of a complex condition branching decision unit and related parts according to an example of the present invention.

FIG. 4 illustrates the state of the instruction decoder 4 in which the instruction code of the complex conditional branch instruction of (2) above has been analyzed and decoded into a bit string.

"s0" (00b) is supplied to the selector 500, which selector 500 then selects the complex condition storage unit 100. This causes the values stored in the condition storage units 101, 102 and 103 (register address, immediate value, R/I flag and comparator selection) to be entered to the condition comparison sub-units 201, 202 and 203, respectively. The results of comparison operations c0, c1 and c2 in the condition comparison sub-units 201, 202 and 203 are output as 2a, 2b and 2c to the complex condition branching decision unit 3, respectively.

In the complex condition branching decision unit 3, the branching condition value 3a and the results of comparison operations 2a, 2b and 2c are compared in a comparator 3c. The result of the comparison 'true (T)/false (F)' is supplied to the selector 10.

The comparator 3c receives "0111b", as the value for the condition for branching 3a from the instruction decoder 4, and "NE" (NOT EQUAL, expressed as "!=", as an operation type 3b.

If the value for the condition for branching "0111b" and the results of comparison operations 2a, 2b and 2c are "NE" (NOT EQUAL), the output of the comparator 3c is true (T).

Figure 8A:
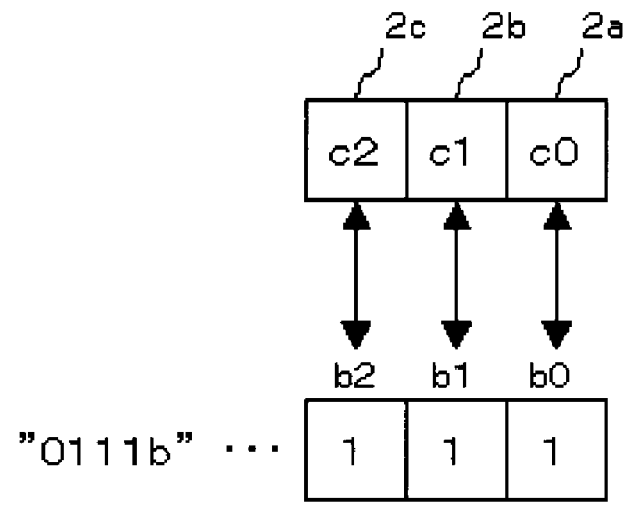
FIGS. 8A and 8B are schematic views showing the state of bit-by-bit matching of the results of comparison operations and the values of conditional branching.
Figure 8B:
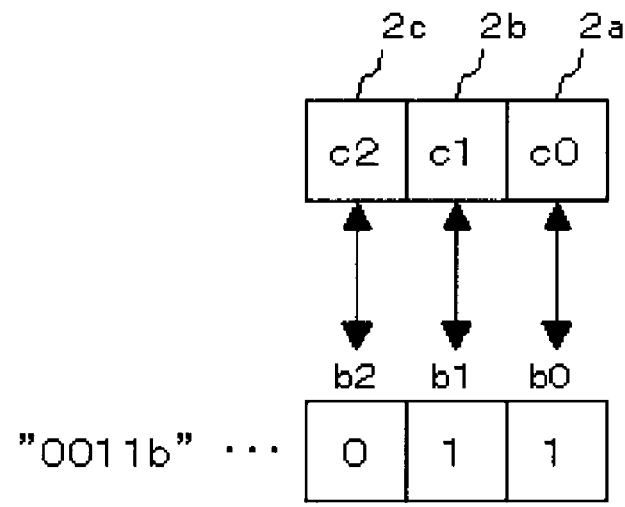

The results of comparison operations 2a, 2b and 2c are here associated with bit 0, 1 and 2 of the value for the condition for branching 3a, respectively, as shown in FIG. 8A. When the value for the condition for branching 3a is "0011b", the results of comparison operation are associated with the bits as shown in FIG. 8B.

If the instruction is that for complex conditional branching (mnemonic beginning with "X", such as "XBNE"), the instruction decoder 4 outputs a value 1 (in binary representation) of an output signal 10a as a selection control signal to the selector 10. The selector 10 thus outputs the result of comparison operation by the complex condition branching decision unit 3 directly to the selector 11.

If the instruction is that for ordinary conditional branching, the instruction decoder 4 outputs 0 as the signal 11a to the selector 10, which selector 10 then selects the output of the conditional branching decision unit 9 to deliver the so selected output to the selector 11. The conditional branching decision unit 9 performs decision on conditional branching based on the value in the flag register 8 as set as a result of operations in the ALU 7.

If the result of operations by the complex condition branching decision unit 3 is T (true), the selector 11 selects the target address of branching "L1" to set it in the program counter 12. Thus, at the next cycle, the instruction located in the target address of branching "L1" is fetched and entered to the instruction decoder 4 for execution.

If the result of operations by the complex condition branching decision unit 3 is F (false), the selector 11 selects "PC+1" and sets it in the program counter 12. Thus, the instruction located in the address "PC+1" is fetched, decoded and executed.

The complex conditional branch instruction, as a sole instruction, thus selects the specified complex condition, stored in the complex condition setting storage unit 1, evaluates simultaneously the comparison operations that make up the complex condition and determines whether branching is to be performed or not.

The operation of the complex conditional branch instruction of the present example is now described with reference to the timing chart of FIG. 9.

Figure 9:
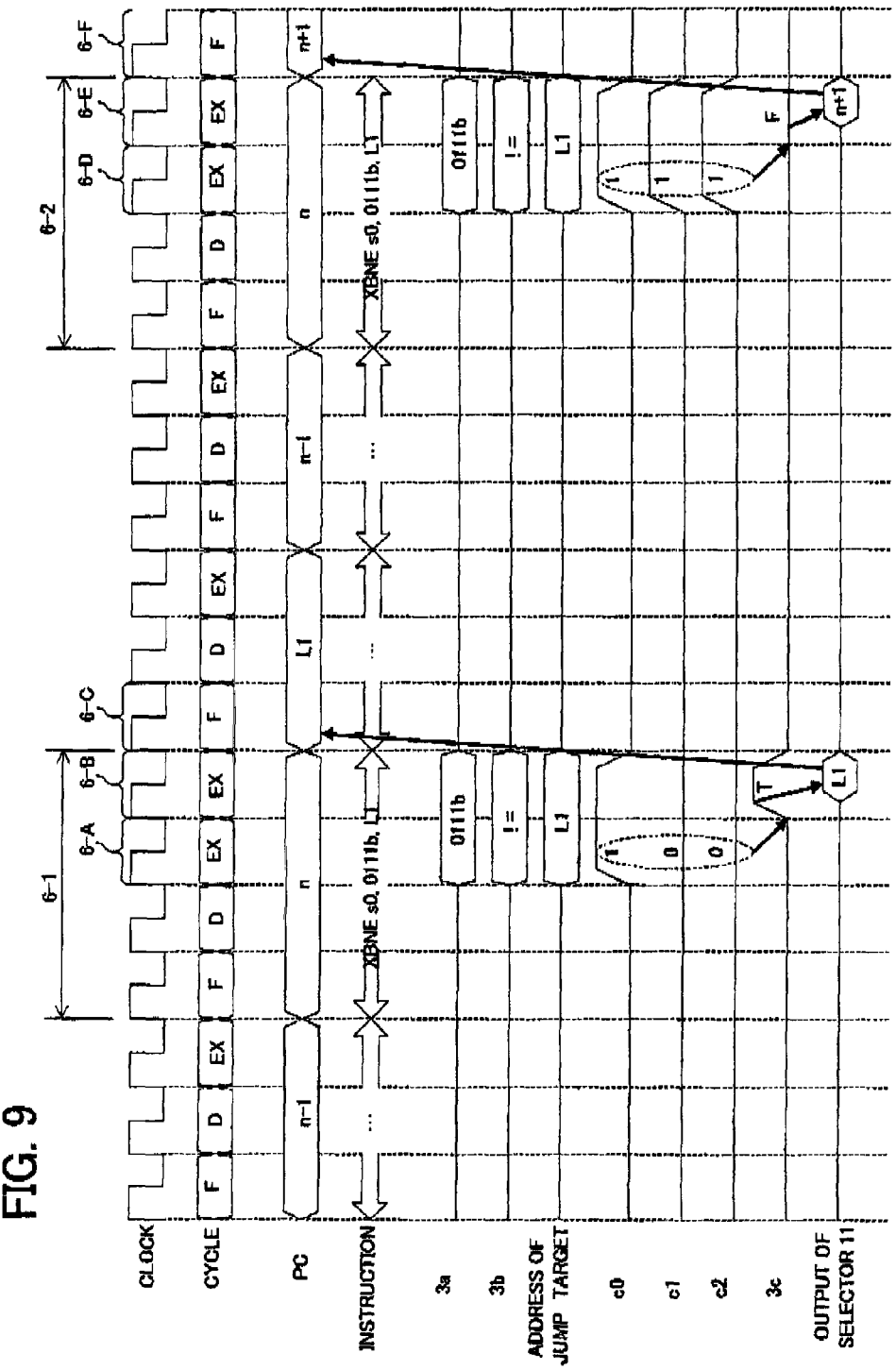
FIG. 9 is a timing chart for illustrating the operation of an example of the present invention.
Figure 11A:
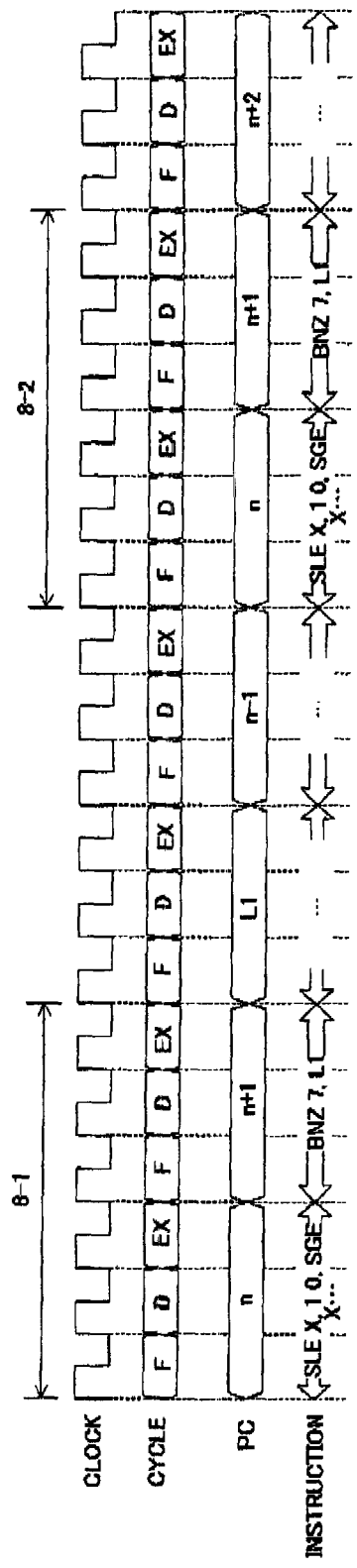
FIGS. 11A and 11B are timing charts for illustrating the operation of Patent Document 1.
Figure 11B:
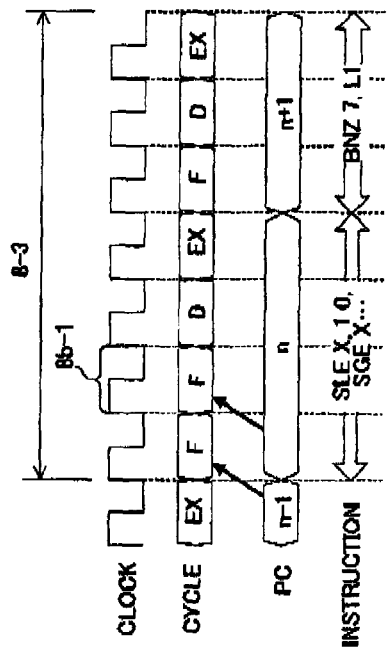

In the first complex conditional branch instruction in an instruction cycle 6-1 of FIG. 9, that is, XBNE s0, 0111b, L1 an instruction code is read from the instruction memory 5 to the instruction decoder 4 in an instruction fetch cycle F.

In the next instruction decode cycle D, the instruction code which has been read is analyzed by the instruction decoder 4, as shown in FIG. 4.

In the instruction decoder 4, "NE" of XBNE (!=) is "001b", which is set in the comparator 3c. Since the decoded instruction is the complex conditional branching, the value 1 (binary value) of the output signal 10a is supplied to the selector 10 as a selection control signal. With the first complex condition setting, "00b" is delivered to the selector 500 of the complex condition setting storage unit 1. The value of the condition for branching "0111b" is set as "0111b" in the comparator 3c. "L1" is supplied as "XXXXXXXXb" (a value indicating a branch target address) to the selector 11.

In an instruction execute cycle EX(6-A), the decoders 201a and 201b of the respective condition comparison sub-units 201, 202 and 203 of the condition comparison unit 2 (see FIG. 3) read the values of the registers of the set of operation registers 6, in association with three conditions, making up the complex condition, using the registers r101a and r101b of the respective condition storage units 101, 102 and 103 that specify the registers of the set of operation registers 6. The comparison operation of the complex condition for setting the first complex condition are then performed. The respective condition comparison sub-units 201, 202 and 203 of the condition comparison unit 2 output the results of comparison operations c0, c1 and c2, respectively. In the next following instruction execute cycle EX(6-B), the comparator 3c compares the results of comparison operations (c0, c1, c2)=(1, 0, 0) with the branching condition value "0111b". Since the results of comparison operations c0, c1, c2 are not all 1, the condition NE (!=) holds. The comparator 3c thus outputs T (true). The selector 11 outputs the branch target address L1. In the next instruction fetch cycle (6-C), the instruction of the branch target address L1, set in the program counter (PC) 12, is fetched. In an instruction execute cycle EX(6-D) of the second complex conditional branch instruction in the instruction cycle 6-2 of FIG. 9, the results of comparison operations (c0, c1, c2) of the condition comparison sub-units 201, 202 and 203 are (1, 1, 1). Since the results of comparison operations c0, c1, c2 are all 1, the condition NE fails to hold. The comparator 3c thus outputs F (false). The selector 11 outputs the next address n+1. In the next instruction fetch cycle (6-F), the instruction of the address n+1, set in the program counter (PC) 12, is fetched.

FIGS. 5A to 5C show an example of a program employing a sole complex condition. By the condition setting instruction of (1) above, three conditions (making up a complex condition) are set (FIG. 5A). In FIGS. 5A to 5C, "//" is a comment symbol indicating that the right side column is a comment.

In FIG. 5A, SETCMP s0, c0, r1, L, r11 selects the complex condition storage unit 100 and the condition storage unit 101 of FIG. 1 to set and store the operation for comparison r1<r11.

SETCMP s0, c1, r2, GE, 10 selects the complex condition storage unit 100 and the condition storage unit 102 of FIG. 1 to set and store the comparison operation r2≧10.

SETCMP s0, c2, r3, EQ, 13 selects the complex condition storage unit 100 and the condition storage unit 102 of FIG. 1 to set and store the operation for comparison r3=R13.

Some processing that modifies the above conditions is then performed, after which the complex conditional branch instruction of (2) above is executed (FIG. 5B).

If all conditions c0, c1 and c2 constituting the complex condition fail to hold, the program jumps to the label L1 to repeat the processing (see the instruction XBNE s0, 0111b, L1).

FIGS. 6A to 6D, 7E and 7F show an example of a program employing a plurality of complex conditions. It should be notified that FIGS. 6A to 6D, 7E and 7F show a single program source list separately, only for convenience for illustration, and that an instruction at the lowermost line of FIGS. 6A to 6D (SETCMP s3, c2, r6, NE, 4) is followed by an instruction at the uppermost line of FIGS. 7E and 7F (LD r10, 0).

The first complex condition is set as shown in FIG. 6A, with the use of three condition setting instructions (SETCMP). The three condition setting instructions of FIG. 6A all specify the complex condition storage unit 100 of the complex condition setting storage unit 1. The respective conditions are set and stored in the condition storage units 101 to 103 in the complex condition storage unit 100 (see FIG. 2).

In similar manner, the second to fourth complex conditions are set, using three condition setting instructions, as shown in FIGS. 6B, 6C and 6D. It should be notified that, in these figures, the complex condition, as set by the three condition setting instructions (SETCMP), are set and stored by the condition storage units 101 to 103 within the complex condition storage units 200, 300 and 400 of the complex condition setting storage unit 1 (see FIG. 2).

The complex conditional branch instruction is written as shown for example in FIG. 7E. The source program of the C language, corresponding to the description of the assembler language, is shown in FIG. 7F.

The procedures of the source program by the assembler language of FIG. 7E and that by the C language of FIG. 7F are now described. Just ahead of a loop (do-loop), r10 of the set of operation registers 6 is set to 0. In the do-loop, the processing A of updating the values of r1 to r3, r11 and r13 is performed. It is then checked whether or not the complex condition (r1<r11) and (r2≧10) and (r3==r13) (conditions s0c0, s0c1, s0c2) holds. If the complex condition hold, the processing B is performed. If the complex condition fail to hold, the processing C is performed in case (r2==0) (condition s1c0), (r4>r12) and (r4!=r14) (conditions s1c1, s1c2) hold.

If (r2==0) fails to hold, and if (r2=r5) (condition s2c2) holds, the processing D is performed. It is then checked whether or not (r5≧3) and (r5<12) hold. If these conditions hold, the processing E is performed and, if otherwise, it is checked whether or not (r6≧1), (r6<10) and (r6!=4) hold. If these conditions hold, the processing F is performed, and the processed G is then performed. The processing as from the label L_LOOP is repeated as long as the exit condition of the do-loop (r10==0) holds. It is noted that r10 of the set of operation registers 6 is to be updated in the course of the processing A to G.

With the present example, judgment of the complex condition, shown in FIG. 7F, may be processed speedily by the assembler program shown in FIG. 7E. That is, in performing the processing for branching with complicated condition judgment and branching, as shown in FIG. 7F, the complex condition are stored by the condition setting instructions shown in FIGS. 6A to 6D at the outset in the complex condition setting storage unit 1. By so doing, it is unnecessary to insert a set of the conditional branch instruction and the condition setting instruction used in the conditional branch instruction, such as a compare instruction, in the loop processing, in which the condition setting instruction is placed directly ahead of the set of the conditional branch instruction. Thus, the condition for decision on whether or not the branching is to be performed may be judged in the loop processing with solely the conditional branch instruction.

The present example has been described with reference to a configuration in which four complex condition storage units 100, 200, 300 and 400 are provided as the complex condition setting storage unit 1 and in which each complex condition storage unit includes three condition storage units 101, 102 and 103. The present invention is not limited to this configuration such that it is only sufficient if at least one complex condition storage unit and at least one condition storage unit are provided, with the numbers of the storage units being not restrictive.

As a modification of the present example, there may be provided two or more complex condition storage units each of which is provided with a plurality of complex condition storage units 100, . . . , 400.

In this case, a bit for selecting the complex condition setting storage units 1 may be added to the complex conditional branch instruction to enable selection of the storage by the so added bit. For example, one of the complex condition setting storage units 1 may be used for interrupt processing. In this case, when the interrupt processing is invoked, control needs to be performed so as to automatically select the complex condition setting storage unit used for interrupt processing.

Alternatively, control may be performed to automatically select one of the complex condition setting storage units 1 on a task basis in a multi-task environment. It is also possible to manage multiple complex condition setting storage units 1 in association with task IDs and to select the particular complex condition setting storage unit 1 with an associated task ID. The present example has been described by taking an example of the configuration made up of a condition storage unit, a complex condition storage unit and a complex condition setting storage unit, or multiple complex condition setting units. This configuration is merely illustrative and the levels of hierarchical storage configuration of the complex condition setting storage units are arbitrary.

The present example has been directed to an example in which the condition comparison unit 2 is provided with three comparators for comparing the complex condition. It is however sufficient that one or more of the comparators for comparing the conditions suffices. However, if the number of the comparators is less than the number of the complex condition that are evaluated simultaneously by the complex conditional branch instruction, the comparison operation are performed in two or more clock cycles, thus leading to a correspondingly increased number of the clock cycles for the complex conditional branch instruction.

The operations and the meritorious effects of the present example will now be described, along with the points of difference of the present example from the aforementioned Patent Documents 1 and 2.

In Patent Document 1 and in the comparative example of FIG. 10, two instructions, namely the instruction for comparison and that for branching, are combined to implement conditional branching. In contrast, according to the present invention, there are provided a condition setting instruction (SETCMP) for setting and storing the complex condition in a specified storage area in the complex condition setting storage unit 1, and a complex conditional branch instruction for fetching the complex condition specified from the associated storage area in the complex condition setting storage unit 1 to perform comparison operation at the time of executing the instruction. Since the condition is pre-set by the condition setting instruction, only a number of cycles necessary to execute a single conditional branch instruction are needed at the stage of conditional branching. Thus, with the present example, it is possible to increase the speed of conditional branching. In particular, if the present invention is applied to a loop operation in which the same condition is repeatedly checked whether it holds or not, the operational speed may be higher than is possible with the related techniques. Moreover, with the present example, provided with a plurality of complex condition storage units (100, 200, 300 and 400 in FIG. 2), a plural number of the complex conditions may be stored to enable the combination of more complex conditions and application to multi-loop operations, thereby improving an operational speed.

It should be noticed that, with the aforementioned Patent Document 2, there is provided only one set of component parts equivalent to the condition storage unit in the complex condition setting storage unit, that is, only one condition. In contrast, according to the present invention, there are provided a plurality of condition storage units, and a selector for specifying which one of the condition storage units is to be selected. Moreover, according to the present invention, there are provided a plurality of complex conditions. In Patent Document 2, as in commonly used techniques, the conditional branch is implemented by two instructions as a set, namely, a compare or operation instruction and a conditional branch instruction, and the conditional branch instruction is executed after executing the compare or operation instruction. In Patent Document 2, a single condition is stored in the condition registers (first and second condition registers), such as overflow, zero or sign. In Patent Document 2, one of output signals of the results of operations (external state signals) from an operating unit, not shown is selected by a condition sign selector. It is therefore necessary to execute the operations for generating the external state signals temporally ahead of the conditional branch instruction. It is thus seen that the invention disclosed in Patent Document 2 is entirely different from the configuration in which a plurality of conditions for complex conditional branching are pre-set (pre-stored) and the conditions so set are executed at the time of processing the conditional branch instruction.

The disclosures of the above-listed Patent Documents are incorporated herein by reference. The examples or examples can be changed or adjusted within the framework of the entire disclosures of the present invention, inclusive of the claims, based on the fundamental technical concept of the invention. Various combinations or selections of disclosed elements are also possible within the framework of the claims of the present invention. That is, the present invention naturally comprises various changes or corrections that may be made by those skilled in the art based on the entire disclosures, inclusive of claims, and on its technical concept.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A processor apparatus comprising:
   an instruction memory that stores therein an instruction set, the instruction set including:
      a condition setting instruction, including:
         a destination of storage of a complex condition, and
         one condition of a plurality of conditions that make up the complex condition,
         wherein the condition setting instruction is an instruction for setting the one condition in storage;
      a complex conditional branch instruction, including:
         a storage area in which the complex condition is stored,
         a branching condition value,
         and a branch target,
         wherein the complex conditional branch is an instruction for performing comparison operations on a plurality of conditions that make up the complex condition, for comparing results of the comparison operations with the branching condition value, and for performing branching to the branch target, based on the comparing result; and
   a complex condition setting storage unit that stores one or more complex conditions, and that, sets a plurality of conditions of each of the one or more complex conditions, upon execution of a plurality of the condition setting instructions;
   a condition comparison unit that performs, upon execution of said complex conditional branch instruction, comparison operations on the plurality of conditions that make up the complex condition in the destination of storage, of the complex conditional branch instruction, and that outputs results of the comparison operations; and
   a complex condition branching decision unit that compares the results of the comparison operations with the branching condition value of the complex conditional branch instruction, that determines whether or not branching to the branch target, of the complex conditional branch instruction, is to be performed, and that outputs a true or false.

2. The processor apparatus according to claim 1, wherein the condition setting instruction includes, in an operand thereof,
   the destination of storage of the complex condition which is a complex condition storage area of the complex condition setting storage unit in which the complex condition is stored;
   the one condition which is a condition storage area of the complex condition storage area in which the one condition is stored;
   a type of the comparison operation; and
   at least one register address of an operation register and immediate data, that are the plurality of conditions that are subjected to the comparison operation.

3. The processor apparatus according to claim 1, wherein the complex conditional branch instruction includes, in an operation code thereof, a type of the comparison between the results of the comparison operation with the branching condition value, and includes, in an operand thereof:

the storage area in which the complex condition is stored which is a complex condition storage area of the complex condition setting storage unit in which the complex condition is stored;

the branching condition value; and the branch target.

4. The processor apparatus according to claim 1, wherein the complex condition setting storage unit includes:

a plurality of complex condition storage units, each complex condition storage unit comprising a plurality of condition storage units, each condition storage unit storing a condition of the plurality of conditions that make up a complex condition wherein each condition comprises a set, each set comprising:

a first address of a first operation register and a second addresses of a second operation register that are subjected to the comparison operation of the condition comparison unit;

immediate data;

a flag indicating which one of a comparison operation between data of the first operation register and the second operation register and a comparison operation between data of the first operation register and the immediate data is to be performed; and a type of the comparison operation;

wherein the complex condition setting storage unit comprises a first selector for selecting a complex condition storage unit corresponding to the storage area in which the complex condition is stored, of complex conditional branch instruction, and corresponding to the destination of storage of the complex condition, of the condition setting instruction; and wherein each of the complex condition storage units comprises a second selector for selecting a condition storage unit corresponding to the one condition, of the condition setting instruction.

5. The processor apparatus according to claim 4, wherein the condition comparison unit includes a plurality of condition comparison sub units, each corresponding to a condition storage unit in a complex condition storage unit; wherein each of the condition comparison sub units comprises:

a first decoder that decodes the first address stored in the condition storage unit, reads data from the first operation register, and holds the data read from the first operation register as a first decoder value;

a second decoder that decodes the second address stored in the condition storage unit, reads data from the second operation register, and holds the data read from the second operation register as a second decoder value;

a third selector that receives, as inputs, the immediate data stored in the condition storage unit and the second decoder value and selects one of the immediate data and the second decoder value, based on the flag; and a comparator that receives, as inputs, an output of said third selector and the first decoder value and performs an operation corresponding to the type of the comparison operation stored in the condition storage unit.

6. The processor apparatus according to claim 1, wherein, in the complex condition setting storage unit, after the execution of a first condition setting instruction, a condition stored as a result of execution of the first condition setting instruction is held until:

a second condition setting instruction is executed, a condition storage unit, corresponding to the condition stored as a result of execution of the first condition setting instruction, is again selected by execution of the second condition setting instruction, and the condition stored as a result of execution of the first condition setting instruction is rewritten as specified in the second condition setting instruction.

7. The processor apparatus according to claim 5, further comprising:

a conditional branching decision unit that performs a condition decision based on a flag register reflecting the result of an operation in an arithmetic/logic unit, and that outputs a true or false;

a fourth selector having a first input connected to an output of the conditional branching decision unit and a second input connected to an output of the complex condition branching decision unit, wherein the fourth selector selects as an output the output of the complex condition branching decision unit if the conditional branch instruction decoded by an instruction decoder is the complex conditional branch instruction; and the fourth selector selects as an output the output of the conditional branching decision unit if the conditional branch instruction decoded by the instruction decoder is not the complex conditional branch instruction; and a fifth selector receiving the output of the fourth selector;

wherein the fifth selector selects the branch address of the conditional branch instruction executed if the output is true; and selects an address corresponding to the current value of a program counter incremented by one to set the incremented value in said program counter if the output is false.

8. The processor apparatus according to claim 1, comprising a plurality of the complex condition setting storage units and a selector for selecting one of the plurality of complex condition setting storage units.

* * * * *